(12) United States Patent
Swanburg et al.

(10) Patent No.: US 8,688,805 B2
(45) Date of Patent: *Apr. 1, 2014

(54) SCENARIO BASED CONTENT DELIVERY

(75) Inventors: Scott Allen Swanburg, Duluth, GA (US); Arthur Richard Brisebois, Cumming, GA (US); Gregg Harold Brown, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1595 days.

This patent is subject to a terminal disclaimer.

(21) Appl. No.: 11/649,305

(22) Filed: Jan. 4, 2007

(65) Prior Publication Data

US 2008/0167016 A1  Jul. 10, 2008

(51) Int. Cl.
*G06F 15/16* (2006.01)

(52) U.S. Cl.
USPC .................. 709/218; 709/224; 455/456.2

(58) Field of Classification Search
USPC ........... 709/218, 223, 202, 203, 224; 725/46; 705/1; 455/432.3, 456.3, 456.2
See application file for complete search history.

(56) References Cited

U.S. PATENT DOCUMENTS

| | | | | |
|---|---|---|---|---|
| 6,347,330 | B1* | 2/2002 | Dawson et al. | 709/203 |
| 6,892,226 | B1* | 5/2005 | Tso et al. | 709/218 |
| 6,978,132 | B1* | 12/2005 | Sladek et al. | 455/432.2 |
| 2002/0024536 | A1 | 2/2002 | Kahan et al. | |
| 2004/0203630 | A1 | 10/2004 | Wang | |
| 2005/0069102 | A1* | 3/2005 | Chang | 379/88.18 |
| 2005/0201320 | A1 | 9/2005 | Kiss | |
| 2005/0251408 | A1* | 11/2005 | Swaminathan et al. | 705/1 |
| 2006/0099944 | A1* | 5/2006 | Ross et al. | 455/432.3 |
| 2006/0271618 | A1* | 11/2006 | Kokubo et al. | 709/202 |
| 2007/0100981 | A1* | 5/2007 | Adamczyk et al. | 709/223 |
| 2007/0130244 | A1* | 6/2007 | Swanburg et al. | 709/200 |
| 2007/0220552 | A1* | 9/2007 | Juster et al. | 725/46 |
| 2008/0090513 | A1* | 4/2008 | Collins et al. | 455/3.01 |
| 2009/0077220 | A1* | 3/2009 | Svendsen et al. | 709/224 |

FOREIGN PATENT DOCUMENTS

KR  20060031247 A  4/2006

OTHER PUBLICATIONS

International Seaching Authority, Notification of Transmittal of the International Search Report and the Written Opinion of the International Searching Authority, or the Declaration, Apr. 26, 2011.
International Seaching Authority, International Search Report, Apr. 26, 2011.
International Seaching Authority, Written Opinion of the International Searching Authority, Apr. 26, 2011.

* cited by examiner

*Primary Examiner* — Jungwon Chang
(74) *Attorney, Agent, or Firm* — Hartman & Citrin LLC

(57) ABSTRACT

Systems and methods are disclosed for providing pertinent multimedia content to mobile subscribers based on dynamically created profiles. Users are provided information relevant to their interests based on dynamic profiles developed as a result of prior patterns of use, interest and behavior. Such profile generation is automated without need for active user participation in selecting what would be desirable information.

20 Claims, 4 Drawing Sheets

SCENARIO BASED CONTENT DELIVERY

BACKGROUND OF THE INVENTION

1. Field of the Invention

The present invention relates to mobile networks. More particularly, the present invention relates to techniques for providing pertinent multimedia content to mobile subscribers based on dynamically created profiles.

2. Background of the Invention

Mobile users are increasingly using their mobile devices for more than just conversations. The advent of wireless data plans means that subscribers now have access to resources that were previously available only through the Internet. These resources are vast, and include, but are not limited to, email, web sites, images, audio, video, news, live feeds and transmissions, maps, etc. This plethora of services revolves around sophisticated, interactive applications provided by server subsystems that enable users to have access to one or more applications quickly and simultaneously, as well as toggle between such multiple applications at will with minimal effort. With increasing bandwidth available to mobile subscribers at lower costs, as well as recent improvements in server technology and communication utilizing the packet-based IP Multimedia System and Session Initiation Protocol, the fusion between mobile devices and IP-enabled computers is well under way.

Unlike the Internet, however, mobile operators are not always the masters of their domain when it comes to monitoring the habits of their users so as to provide them with better quality and more relevant content. Companies operating on the Internet currently have access to a vast amount of information about their customers and about the people who visit their web sites. These companies record every transaction their customers make on the company's website, as well as using cookies to monitor the user's interaction with their web sites, thereby giving the company insight into the user's interests. The company may then in turn use the information it has derived to offer customized products and services to the user or to target advertising at the user.

Similarly, mobile network operators also collect information about users of the network. Every time a client uses an application or service, such as text messaging, a billable event is generated and recorded. The network operators can use the information generated to offer tailored products and services to users. New technology is also capable of profiling subscriber's habits in real time so that the user himself may benefit directly from the information about his daily life. However, such a system is not currently in place because the benefits of such profiling are not fully realized. Currently, mobile subscribers have to seek out content that pertains to their tastes, and there is limited guidance offered to these subscribers as to the availability of multimedia resources on their networks. Also, targeting single users is generally inefficient and no mechanism in the art exists to be able to bring together mobile subscribers having similar tastes and provide them with targeted content. What is needed is an efficient system to exploit the availability of subscriber habits and related information, and provide content to the user that is pertinent to their tastes.

SUMMARY OF THE INVENTION

The present invention addresses the issues surrounding targeted content delivery by delivering relevant multimedia content to mobile subscribers based on dynamically generated user profiles. Systems and methods are provided to use the information from these user profiles to correlate common elements and "push" relevant multimedia and related data that pertains to the taste of the subscriber. The user profiles are created in a Dynamic Event Server Subsystem (DESS) which includes an Intelligent Information Collecting Repository (IICR) that stores and analyzes a mobile subscriber's usage, browsing, and download habits in the form of a dynamically generated profile. This dynamically generated profile is matched with other subscriber's profiles, and common elements are put together to create community profiles, thereby increasing the efficiency and reducing the footprint of profile databases. Related information is pushed to these subscribers, who are presented with multiple options to further explore this information by downloading or purchasing additional content, or subscribing to more information resources. The present invention makes extensive use of the existing IP Multimedia System (IMS) and SIP signaling to improve communication and interaction between server elements as well as between end users and the mobile network.

In one exemplary embodiment, the present invention is a series of Dynamic Event Servers (DES) along with an IICR that correlates information in a subscriber's dynamically generated profile as well as a subscriber's location, and provides the subscriber with a series of radio presets that can be sent to any digital or analog radio tuner (AM, FM, XM, Sirius, IP Radio, etc.). In a related embodiment, the subscriber's device may pull artist/title and other related information about a song from the wireless-equipped radio tuner and use this data to purchase said song, share it with other subscribers having similar interests, or exercise other options that are dependent on the media content, such as purchasing concert tickets or joining existing fan clubs.

In another exemplary embodiment, the subscriber's dynamically generated profile contains relevant data about the subscribers Instant Messaging habits, including peak usage times and most active contacts. The IICR then suggests to the subscriber an automated procedure to set up group chats with the subscriber's most active contacts on a regular basis, based on the data in the subscriber's profile.

In another exemplary embodiment, the IICR correlates related information among multiple mobile subscribers to generate content that is pertinent to a subscriber's tastes.

In another exemplary embodiment, the subscriber's regular viewing of traffic conditions, sports scores, and local weather are all stored in subscriber's dynamically generated profile. The IICR suggests to the subscriber a combined "packet" of all the regularly accessed information that is delivered at a convenient time without any extra effort on the part of the subscriber.

In yet another exemplary embodiment, the present invention is a method for delivering relevant multimedia content to a mobile subscriber based on a combination of information including, but not limited to, the subscriber's personal preferences, usage habits, and elements shared with other mobile subscribers.

DETAILED DESCRIPTION OF THE INVENTION

Figure 1:
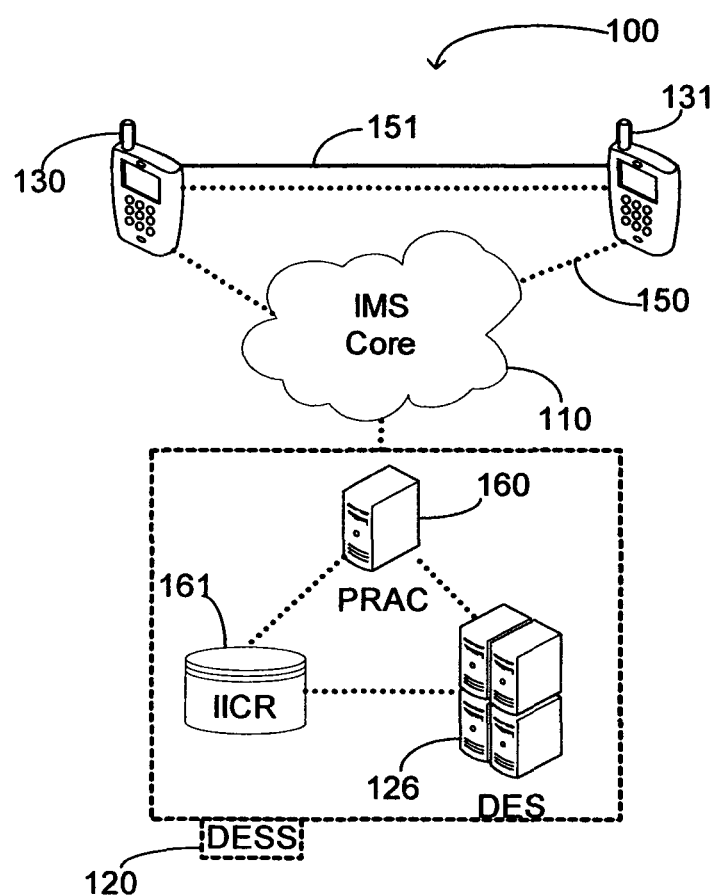
FIG. 1 shows a network system for collecting profile information and delivering pertinent content to subscribers in an IP Multimedia System (IMS) environment, according to an exemplary embodiment of the present invention.

The present invention provides for systems and methods for delivering relevant multimedia content to mobile subscribers based on dynamically generated user profiles over an IP Multimedia System (IMS). Scenario Based Services (SBS) are used to generate profiles of mobile subscribers based on personal interests, as well as dynamically generated content such as usage statistics, wireless web browsing habits, and wireless purchases. The data in these profiles are provided by information in the network, as well as from applications that the subscriber uses, such as media streaming and downloads, web browsing, instant messaging (IM), mapping software, etc. Combined with location and network information, these profiles are then referred to, and content tailored to a subscribers interests is forwarded in real time to the subscriber, who is presented with options to purchase or otherwise acquire this content. The subscriber may also be presented with additional related information based on information compiled in other databases such as other subscribers with common interests, or fan clubs. In addition, the subscriber is given options to share their recommendations and content with other subscribers having similar interests, based on common elements in their dynamically generated profiles.

For the purposes of this invention, the term Scenario Based Services (including Scenario Based Music/Content Delivery) is used herein to describe a setup in which a suite of applications is made available for use during differing scenarios and contexts. The intelligent push and pull of applications foster communications across specific communities of interest. The user interface allows for a user defined customizable "desktop" accessing ability for using multiple applications simultaneously. The presentation of such universal information may be based on community or individual preferences.

Dynamic Event Server Subsystem (DESS) as used herein is a network system that contains network enabled applications to be offered up dynamically to mobile terminals with dependency on contextual usage. This system creates an efficient way in which to launch these applications, authenticate their use, store data associated with the usage of individual applications and the interaction between associated applications at the macro network level. New "state" information collected at the DESS may be transmitted to the terminal (or micro) level of the network. Multiple levels of communication include interaction between the mobile device/client and the applications server (AS), between multiple application servers, and between multiple servers at which time the subscriber state change is collected and an aggregation server described in this disclosure as the Proxy Registration Authentication Collection (PRAC) server.

Since this scenario utilizes features present in an IP Multimedia System (IMS) environment, it is very useful to further define this term. IMS basically describes a system by which mobile operators can offer and charge for discrete services that are usually available on the Internet, alongside current services being offered. This architecture works with any packet-switching network, is IP-based, and therefore has tremendous potential for services like VoIP, push-to-talk, video-conferencing, IM, presence information, etc. An example of a standardized signaling protocol is the Session Initiation Protocol (SIP). SIP allows two elements in a network to find each other and open lines of communication easily, and is a significant part of IMS. Ideally every mobile device and network element has a unique SIP address for the purposes of this disclosure. Interactive applications communicate with the user and among themselves using SIP signaling over an IP network, compile data, and submit patterns to the IICR. Compilation can take place either on the handset or at the server end. In addition, a mobile device for the purposes of this disclosure includes any communications device with the ability to send and receive data across IP or any related packet-based networks, as well as devices capable of communicating over PSTN or other legacy networks.

FIG. 1 shows an exemplary network system 100 for collecting profile information and delivering pertinent content to subscribers in an IP Multimedia System (IMS) environment. SIP signaling 150 is used to initiate and communicate between Mobile Subscribers (MS) 130, 131, IMS Core 110, and Dynamic Event Server Subsystem (DESS) 120, consisting of a Proxy Registration Authentication Collection server (PRAC) 160, Intelligent Information Collection Repository (IICR) 161 and Dynamic Event Servers (DES) 126. DES 126 consists of multiple Application Servers (AS) including but not limited to Instant Messaging server, Presence server, Content server (Media Resource Server), and Location server. DES 126 contains network enabled applications to be offered up dynamically to mobile terminals with dependency on contextual usage in a way that launches these applications based on authentication for use, stores data associated with the usage of individual applications and the interaction between associated applications at the macro network level. The information collected is transmitted to IICR 161. PRAC Server 160 is the interface to the IMS core 110, and controls subscriber access to the server hosting a particular application. Network authentication and security functions may be performed (as a part of IMS Core 110) prior to engaging PRAC server 160. Subscribers may be authenticated based on their current status of active registration for applications on the DESS 120. SIP signaling 150 is used to facilitate the communication between the various components of DESS 120.

A plurality of profiling engines generate and store user profiles in real time based on information available in a network as well as information generated by applications on the device. These profiling engines compile user information, in real time, into a plurality of profiles. This information can come from a user's interaction with the network, with applications on a user's mobile device, or from any other source, and includes but is not limited to usage patterns, purchases via mobile device, and billing information. Specific examples include web browsing habits, song/video downloads/purchases, user-defined preferences, as well as peak usage dates and times, protocols used, as well as similar information from other mobile subscribers' profiles. The profiling engines compile the information they gather in real time into a personal or community profile, and store the profiles in the IICR. The profiles are then made available to applications and services in the network so that those applications and services can assist the user in the performance of his daily tasks.

Figure 2:
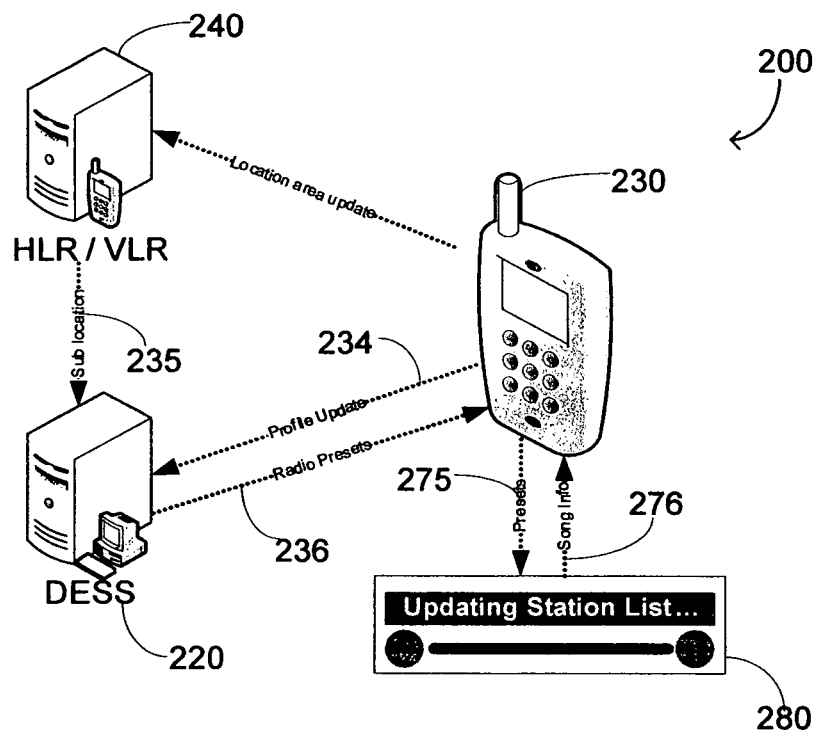
FIG. 2 shows a Dynamic Event Server Subsystem providing music-related recommendations according to an exemplary embodiment of the present invention.

FIG. 2 shows a Scenario Based Music Delivery system 200, an exemplary multimedia content delivery system according to an embodiment of the present invention. Subscriber 230 has a stored profile 234 on IICR within DESS 220, as well as location and network information 235. As described above, this profile was compiled in real time via profiling engines based on subscriber's browsing and purchasing habits, as well as pre-programmed preferences. Ideally this profile is generated dynamically in a way that involves no work whatsoever for the subscriber. Subscriber's location information is transmitted via the Home Location Register (HLR) 240 to DESS 220. DESS 220 and IICR will correlate the profile and location information with a Media Server within the DES, which contains music resources as well as radio information local to subscriber, and recommendations based on subscriber's interests. IICR will then send targeted content information 236 to subscriber based on this profile. Based on the location and network information, this content includes radio station presets that may apply to standard AM/FM tuners or satellite radio receivers 280, such as Sirius or XM. The information could also include radio show schedules that pertain to subscriber's interests, as derived from subscriber's profile in DESS 220. Subscriber 230 may now program the radio tuner 280 to these presets and enjoy the programming that is pertinent to his interests. In fact, if tuner is one of the many BLUETOOTH-enabled radio devices available on the market today, subscriber 230 may communicate this radio preset 275 and scheduling content to tuner wirelessly from his mobile device.

In this scenario, wireless-enabled tuner 280 also has the ability to broadcast media information 276 back to subscriber. This information could include artist/title information for a song, or any information related to the current broadcast, such as album, release date, genre, or any other information commonly "tagged" to audio media. Subscriber 230 then has this information at his fingertips, which enables him to perform a variety of actions. Subscriber 230 may tag this information to store in a shopping cart or wish list for future purchase. Then at a later time the subscriber may scroll through the list and select to purchase the song, which will be delivered to the device. Alternatively, subscriber 230 may perform an instant purchase of the song at the push of a button. The song would then be downloaded to subscriber's memory card and can be listened to at any time. Subscriber could also elect to add the artist to a list of favorites and subsequently receive notification of concerts, live broadcasts, and new CD releases by the artist on his device via text, email, SIP, instant message, etc.

A subscriber may also elect to join a fan club or related group that combines people with similar interests and provides recommendations for similar content, all at the touch of a button. Once this occurs, the subscriber's profile is updated with fan club information. This allows a wide range of media and information to be pushed to the subscriber. For instance, a fan of a certain band would get access to and receive artist biographical info, discography, tour dates/info, message boards, links to digital goods (ringtones, answertones, wallpaper, games), video, news relating to contests and giveaways, special advance access to tickets, artist message board, exclusive band interviews, tour blogs/recording diary, user generated content, and chat/community access.

The subscriber will also have the option to push new or previously unavailable content to other members of the fan club. Referring back to FIG. 1, a SIP session can be established between two or more subscribers belonging to the same fan club, and a data connection 151 can be used to transfer multimedia resources among users. With an IMS implantation, no WAP gateway is required since the devices can operate peer-to-peer. In an IMS environment, one device is the "server" and the other is the "player". Once an IP session is set up via SIP, the interaction between multiple subscribers on the fan club can be recorded and used to provide a more personalized content, such as user favorites, top 10 playlists, etc., as well as recognition of the top resource contributing subscribers, and information about new members. Additionally, using the concept of the BLUETOOTH-enabled radio, song information or a song itself could be shared with multiple users of a fan club simultaneously, where each subscriber is on an IP enabled device. The option of sharing could be exercised by any mobile subscriber from their own device either via the community webpage or online forum, or directly to certain members of the fan club, depending on the application in use and the content being delivered. This applies to any IP-enabled device, including personal computers, or IP-enabled portable music players such as the Microsoft Zune, etc.

The concept of profile-based content delivery can be further utilized to provide additional related content to a subscriber based on his actions. For instance, subscriber 230 may have at some point purchased or viewed a live IP radio/TV broadcast on his mobile device, such as a Canadian Curling Team tournament. This preference would have been updated in the IICR, and subsequently DESS 220 would have sent to subscriber 230 a notification that the Canadian National Curling team was a featured host at a press conference and dinner held at a convention center in subscriber's 230 hometown. Subscriber 230 would then be given an option to purchase tickets for this event at the touch of a button, or be able to purchase or view a live broadcast of the press conference. Substituting Canadian Curling Team with a rock band, such as Primus, and a press conference with an after-concert party, subscriber 230 would be given an option to purchase backstage passes or could be sent a password to enter the party. In this way, pertinent content that DESS 220 appreciates and seeks is automatically forwarded to the subscriber based on his compiled profile.

Figure 3:
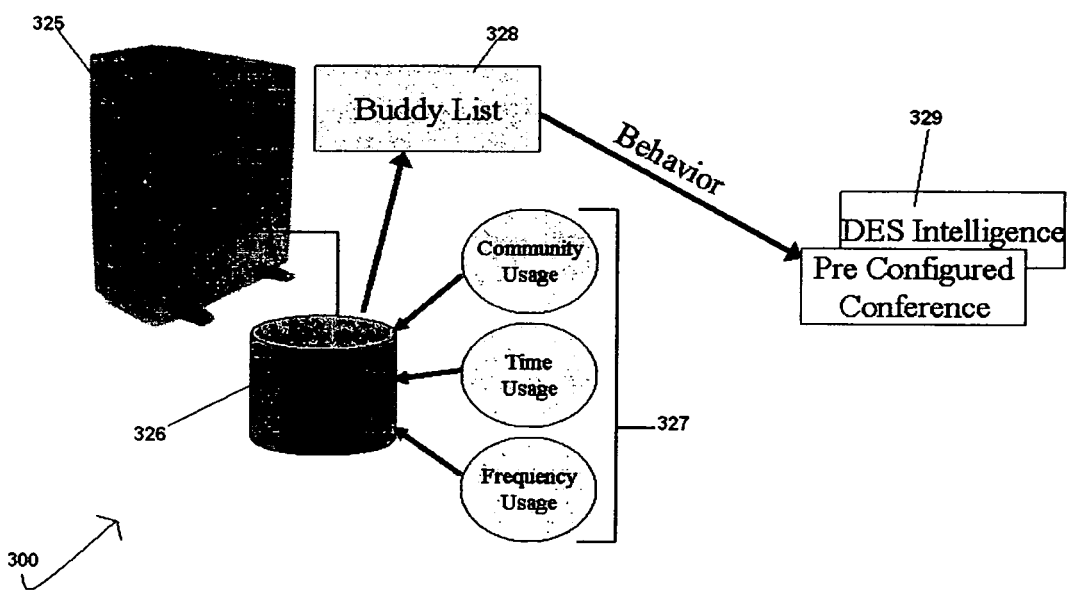
FIG. 3 shows a Dynamic Event Server Subsystem being used to predict and automate a subscriber's actions according to an exemplary embodiment of the present invention.

This concept also works for Instant Messaging (IM). In the exemplary embodiment 300 shown in FIG. 3, DES 325 is an IM host. The specific IM network enabled application is hosted at the server and provides basic IM functionality to the subscriber network. As with other network enabled applications, the IM server provides its specific functions related to this application such as logic for the transmission of short messaging. This specific implementation takes advantage of SIP for Instant Messaging and Presence Leveraging Extensions (SIMPLE). IICR 326 acts as an information database to collect behavioral usage information such as time of use, interaction between other IM subscribers and volume of usage. For instance, supposing that the subscriber is a foreign exchange student who regularly sets up a multi party IM session at around 10:00 P.M. EST with four of his family members 328 across the globe. A rule has been set up in DES 325 to search for events or other variables 327 with certain frequencies of use, and the subsequent data is collected in IICR 326. A message 329 is sent to the subscriber providing him the option to preset an IM session with these participants. Subscriber may select "Yes", at which point the participants are pre-invited via SIP. Therefore, the data collected from a user's routine are used so that the user does not have to repeat the series of steps each time to create the same use routine.

Figure 4:
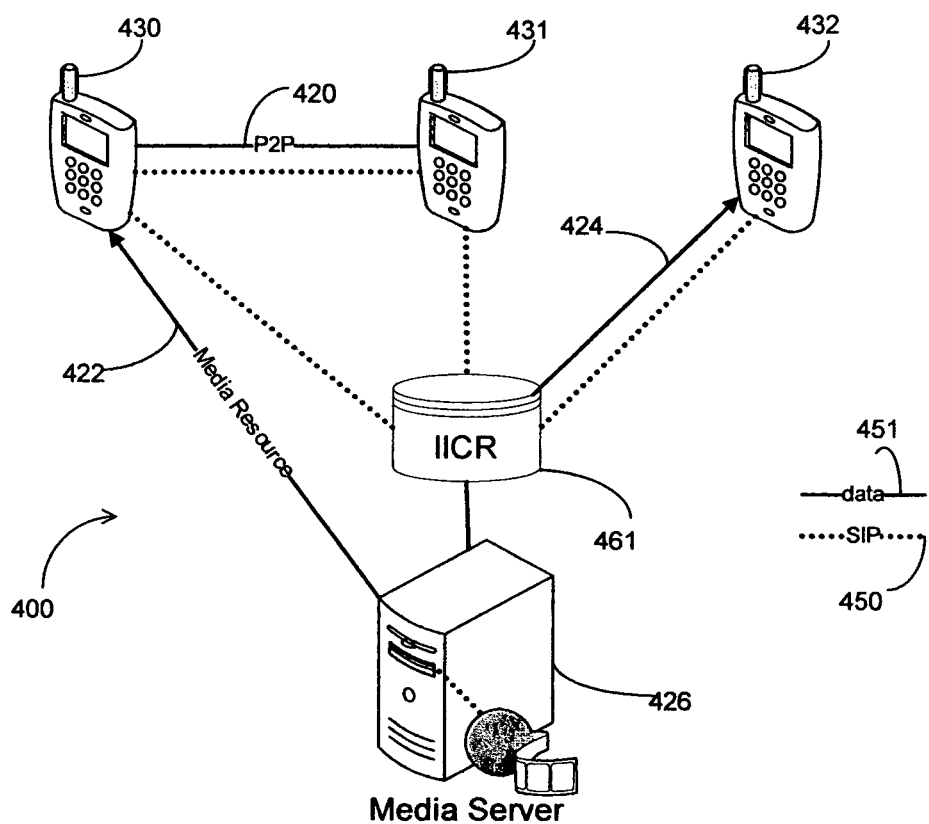
FIG. 4 shows the functionality of user recommendations to a community profile according to an exemplary embodiment of the present invention.

Recalling the concept of pushing multimedia content to members of a fan club, FIG. 4 shows a system 400 of how content may be shared between users of such fan club. Mobile subscribers 430, 431, 432 have profiles that have similar elements such that they are members of a community profile or fan club. For instance, subscribers 430, 431, 432 may all enjoy the music of reggae musician Bob Marley. All subscribers have SIP connectivity with IICR 461, which contains a community profile for Bob Marley fans. IICR 461 correlates these preferences with Media Server (MS) 426 element of a DES. MS 426 contains multiple media resources related to Bob Marley, including news and biographical information about the artist, concert reviews, song samples and entire songs available for purchase, images, as well as concert schedules, and links to similar artists. As previously described, IICR 461 retrieves relevant content and pushes it to subscribers 430, 431, 432 based on their individual preferences as well as the profiles of the community. The network elements communicate with each other and with mobile subscribers via SIP, shown by a dotted line 450, and data is transferred via any data connection shown by a solid line 451.

Now suppose that subscriber 430 independently comes across a rare sound clip that shows a previously unknown band performing a live cover version of one of Bob Marley's songs. This media resource exists on MS 426, but it may just not have been deemed relevant enough by the IICR 461 to be pushed to the fan club members. Subscriber 430 has downloaded this resource 422 and wishes to share this media resource with other fan club members, and may do this in more than one way. Subscriber 430 may update the community profile in IICR 461 with the resource, and request IICR 461 to push this content to other members who will be given the option to download and/or purchase the song. For instance, the subscriber may request that IICR 461 push the file or the option to download the file to subscriber 432. The IICR 461 then transmits this request 424 to subscriber 432. However, in an IMS framework using SIP 450, every device should have a unique SIP address and is therefore able to communicate directly with other devices. Therefore, subscriber 430 may choose to initiate a direct peer to peer (P2P) connection 420 to pass the Bob Marley cover media file to subscriber 431. This is easily accomplished by using SIP 450 to initiate the P2P session. In this way, subscriber 430 may target one or more members of a fan club and push media (or the option to download/purchase media) directly without having to go through the DESS, thereby saving valuable server resources.

Figure 5:
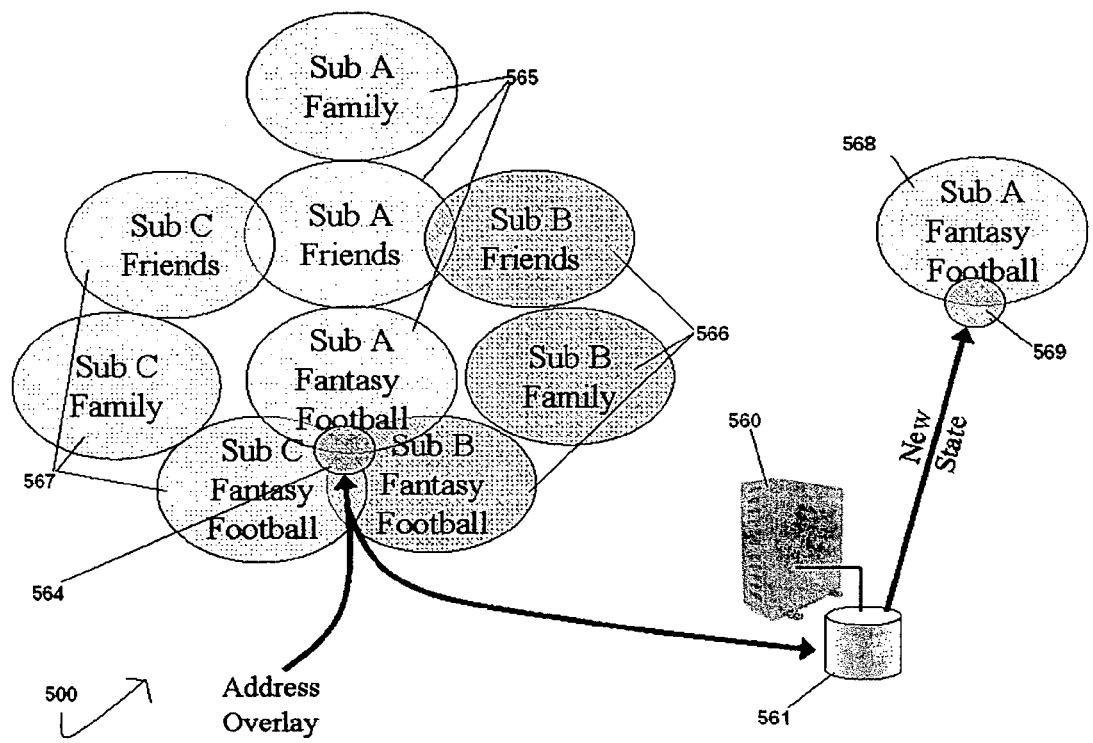
FIG. 5 shows an example of using common elements from multiple profiles to provide related content, according to an exemplary embodiment of the present invention.

Another exemplary scenario 500 of an IICR sending relevant information to subscribers based on profiles is shown in FIG. 5. The DES 560 will collect data associated with its own application and the interaction with other applications, and submit the profile changes to the IICR 561. In this instance, three subscribers 565, 566, 567 utilize Instant Messaging address books. Each subscriber has address books labeled Friends, Family and Fantasy Football. Sub A 565 has coincident relationships 564 in his Friends address books with Sub B 566 and Sub C 567. Each subscriber also has a profile stored and updated in the IICR 561. However, Sub A 565 is unaware of the fact that he shares common relationships 564 with people from Sub B 566 and Sub C 567 Fantasy Football address books. IICR 561 may be programmed to find such relationships and send information back to subscribers regarding this condition. In this case, the following message may be transmitted via e-mail, SIMPLE IM, or SMS to Sub A: "Sub B and Sub C have the following people in their address books that you also have: Person X, Person Y, Person Z. Would you like to add these people to one of your address books with these relationships stored?" Sub A answers affirmatively and a newly defined relationship or community of interest 568 is set up for these people with common interest 569. This concept can be extended to any common element that multiple users share, thereby creating new community profiles and more efficient and relevant resource handling.

Figure 6:
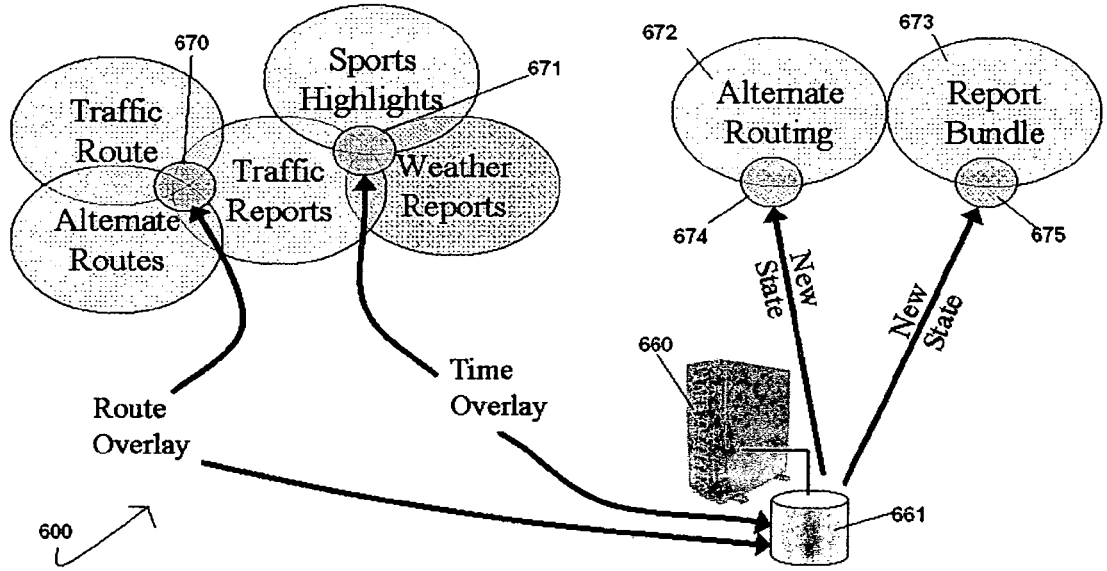
FIG. 6 shows collection of new information relating to recommendations, according to an exemplary embodiment of the present invention.

FIG. 6 shows another example 600 of relationships and state changes, according to the present invention. Every morning between 5:30 and 6:00 A.M. a subscriber views content on his mobile device for weather, sports highlights and the local traffic reports regarding a specific portion of highway. After a week's worth (or other period of time) of data collection, the IICR 661 associated with a PRAC 660 within the DESS recognizes a pattern for this behavior, namely at the same time each day a request of this type is made (a time overlay dependency 671). A query is sent back to the subscriber asking "Would you like me to set up a daily report for you that you can view first thing in the morning which includes sports highlights, weather report and traffic report for your local area?" The subscriber answers yes and a pre-bundle of service 673 is set up to download at 5:15 every morning.

Additionally, another pattern is recognized from the traffic reporting. A second query from the subscriber (on a daily basis) is associated with a specific traffic route. The subscriber is interested in the route with the least amount of time to destination (association of Traffic Report, Traffic Route and time of day repeated every work day—a route overlay dependency 670). An alternate route database may also be available from a Location server. The IICR 661 associated with a PRAC 660 sends a query to the subscriber with the following "Would you like me to provide you with alternate routes for your destination if the time exceeds "X" value for your commute with the current route?" The subscriber would like this rule set up and the IICR 661 stores the information. On days when the traffic route exceeds the allotted time limit, alternate routes 672 are given to the subscriber. Once again, these routes can be pre-stored and transmitted prior to the necessary time, invoked only when the "time exceeds" condition 674 is met.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A network system comprising:
   a profiling engine that
      generates a user profile based on usage habits of a user,
      matches the user profile to a plurality of user profiles based on common elements of the user profile and the plurality of user profiles,
      generates a community profile comprising a compilation of the common elements, and
      provides the community profile to a repository; and the repository, wherein the repository
stores the community profile, and
delivers recommendations to a device associated with the user, the recommendations being derived from the community profile.

2. The network system of claim 1, further comprising a plurality of servers, and wherein each server of the plurality of servers hosts an application that utilizes the community profile.

3. The network system of claim 2, wherein the plurality of servers communicate with each other and other network elements via session initiation protocol.

4. The network system of claim 3, wherein the device comprises a session initiation protocol device.

5. The network system of claim 4, wherein the profiling engine collects information regarding an interaction between the application and the device.

6. The network system of claim 4, wherein the profiling engine collects information regarding an interaction with and usage of applications that are hosted on the device.

7. The network system of claim 1, wherein the profiling engine collects information regarding purchases of multimedia content associated with the user.

8. The network system of claim 7, wherein the recommendations relate to additional purchases of multimedia content.

9. The network system of claim 7, wherein the repository comprises logic that enables the user to recommend the purchased multimedia content and the downloaded multimedia content to a plurality of users associated with the community profile.

10. The network system of claim 1, wherein the repository comprises logic that enables the user to recommend the purchased multimedia content and the downloaded multimedia content to a plurality of users associated with the community profile.

11. The network system of claim 1, wherein the profiling engine collects information regarding downloads of multimedia content associated with the user.

12. The network system of claim 11, wherein the recommendations relate to additional downloads of multimedia content.

13. A method comprising:
recording, by a profiling engine, information regarding a usage of a plurality of interactive applications by a mobile subscriber of a plurality of mobile subscribers;
compiling, by the profiling engine, a profile for the mobile subscriber based on the information, the profile being made available to the plurality of interactive applications;
associating, by the profiling engine, the profile with multimedia content;
providing, by the profiling engine, a recommendation to a mobile device associated with the mobile subscriber, the recommendation being to download the multimedia content;
compiling, by the profiling engine, a community profile based on interactions between the plurality of mobile subscribers and the plurality of interactive applications; and
providing, by the profiling engine, an option to the mobile subscriber via the mobile device to share the multimedia content from the mobile device to a further mobile device associated with a further mobile subscriber of the plurality of mobile subscribers associated with the community profile.

14. The method in claim 13, wherein the plurality of interactive applications is hosted by a plurality of application servers, and wherein the plurality of application servers communicate with a plurality of mobile devices associated with the plurality of mobile subscribers via session initiation protocol, the plurality of mobile devices comprising the mobile device and the further mobile device.

15. A method comprising:
generating, by a profiling engine, a user profile based on usage habits of a user;
matching, by the profiling engine, the user profile to a plurality of user profiles based on common elements of the user profile and the plurality of user profiles;
generating, by the profiling engine, a community profile comprising a compilation of the common elements; and
providing, by the profiling engine, the community profile to a repository so the repository can provide a recommendation to a device associated with the user, the recommendation being derived from the community profile.

16. The method of claim 15, further comprising collecting, by the profiling engine, information regarding a purchase of multimedia content made by the user.

17. The method of claim 16, wherein the recommendation relates to an additional purchase of multimedia content.

18. The method of claim 15, further comprising collecting, by the profiling engine, information regarding a download of multimedia content made by the user.

19. The method of claim 18, wherein the recommendation relates to an additional download of multimedia content.

20. The method of claim 15, further comprising collecting, by the profiling engine, information regarding an interaction with and usage of application that are hosted on the device.

* * * * *